United States Patent
Resnati et al.

(10) Patent No.: US 10,243,263 B2
(45) Date of Patent: Mar. 26, 2019

(54) ANTENNA ARRAY WITH INTEGRATED FILTERS

(71) Applicant: CommScope Technologies LLC, Hickory, NC (US)

(72) Inventors: Giuseppe Resnati, Seregno (IT); Igor Timofeev, Dallas, TX (US)

(73) Assignee: CommScope Technologies LLC, Hickory, NC (US)

( * ) Notice: Subject to any disclaimer, the term of this patent is extended or adjusted under 35 U.S.C. 154(b) by 160 days.

(21) Appl. No.: 14/475,775

(22) Filed: Sep. 3, 2014

(65) Prior Publication Data

US 2015/0318876 A1 Nov. 5, 2015

Related U.S. Application Data

(60) Provisional application No. 61/986,166, filed on Apr. 30, 2014.

(51) Int. Cl.
  *H01Q 1/24* (2006.01)
  *H04B 1/00* (2006.01)
  (Continued)

(52) U.S. Cl.
  CPC .............. *H01Q 1/246* (2013.01); *H01Q 1/22* (2013.01); *H01Q 3/36* (2013.01); *H01Q 21/08* (2013.01); *H04B 1/0057* (2013.01)

(58) Field of Classification Search
  None
  See application file for complete search history.

(56) References Cited

U.S. PATENT DOCUMENTS

| 4,689,627 A | 8/1987 | Lee et al. |
| 6,208,299 B1 | 3/2001 | Lindmark et al. |

(Continued)

FOREIGN PATENT DOCUMENTS

EP 2706613 A1 3/2014

OTHER PUBLICATIONS

"Dual-Bank Panel Dual Polarization Half-Power Beam Width Adjust. Electr. Downtilt," Kathrein Antennen Electronic, Kathrein-Werks KG, Germany; 2014; pp. 1-2.

(Continued)

*Primary Examiner* — Kashif Siddiqui
*Assistant Examiner* — Mehedi S Aley
(74) *Attorney, Agent, or Firm* — Myers Bigel, P.A.

(57) ABSTRACT

An exemplary antenna system has first and second antenna elements, where a diplexer is connected to each second element. First phase shifters are connected to the first elements and to the diplexers, and second phase shifters are connected to the diplexers, but not to the first elements. Either a different bandpass filter is connected to the first and second phase shifters or a single multiplexer is connected to all phase shifters. The antenna system can be used to support communications over first and second sub-bands with independent beam tilts and equivalent beamwidths, where all of the elements are used for the first sub-band, and the second elements, but not the first elements, are used for the second sub-band. Each first element is separated from an adjacent element by a first distance, and each second element is separated from an adjacent element by a second distance different from the first distance.

18 Claims, 4 Drawing Sheets

(51) Int. Cl.
*H01Q 1/22* (2006.01)
*H01Q 3/36* (2006.01)
*H01Q 21/08* (2006.01)

(56) References Cited

U.S. PATENT DOCUMENTS

| | | | | |
|---|---|---|---|---|
| 2003/0109242 | A1* | 6/2003 | Ohtaki | H04B 7/084 |
| | | | | 455/335 |
| 2004/0166802 | A1* | 8/2004 | McKay, Sr. | H04B 7/15535 |
| | | | | 455/15 |
| 2006/0208944 | A1* | 9/2006 | Haskell | H01Q 1/246 |
| | | | | 342/368 |
| 2010/0151865 | A1* | 6/2010 | Camp, Jr. | H04W 72/046 |
| | | | | 455/445 |
| 2012/0243449 | A1* | 9/2012 | He | H04L 27/00 |
| | | | | 370/281 |
| 2013/0040581 | A1* | 2/2013 | Alberth | H04B 17/102 |
| | | | | 455/70 |
| 2013/0148636 | A1* | 6/2013 | Lum | H04B 1/0064 |
| | | | | 370/336 |
| 2013/0207878 | A1* | 8/2013 | Mital | H01Q 1/34 |
| | | | | 343/893 |
| 2013/0214973 | A1 | 8/2013 | Veihl et al. | |
| 2013/0235806 | A1* | 9/2013 | Nilsson | H01Q 1/246 |
| | | | | 370/328 |
| 2013/0252671 | A1* | 9/2013 | Liu | H04B 7/10 |
| | | | | 455/562.1 |
| 2014/0242930 | A1* | 8/2014 | Barker | H01Q 1/246 |
| | | | | 455/129 |
| 2015/0244072 | A1* | 8/2015 | Harel | H01Q 3/36 |
| | | | | 342/372 |
| 2016/0365889 | A1* | 12/2016 | Weissman | H04B 1/52 |

OTHER PUBLICATIONS

International Search Report and Written Opinion; dated Jan. 16, 2015 for the corresponding PCT Application No. PCT/US2014/063620.

Preliminary Report on Patentability and Written Opinion, corresponding to PCT/US2014/063620; dated Nov. 10, 2016, 8 pages.

\* cited by examiner

100

200

300

400

500

ANTENNA ARRAY WITH INTEGRATED FILTERS

CROSS-REFERENCE TO RELATED APPLICATIONS

This application claims the benefit of the filing date of U.S. provisional application No. 61/986,166, filed on Apr. 30, 2014, the teachings of which are incorporated herein by reference in their entirety.

BACKGROUND

Field of the Invention

The present invention relates to communications equipment and, more specifically but not exclusively, to antenna arrays for base stations in cellular communications networks.

Description of the Related Art

This section introduces aspects that may help facilitate a better understanding of the invention. Accordingly, the statements of this section are to be read in this light and are not to be understood as admissions about what is prior art or what is not prior art.

Many modern base station antennas (BSAs) need to be multi-carrier and multi-operator and need to support different communication standards and different frequency ranges. One BSA can cover two or more relatively wide frequency bands (e.g., 698 MHz to 960 MHz plus 1710 MHz to 2690 MHz). To work with different standards and/or with different operators, a wideband BSA can be integrated with distributed filters.

Antenna arrays with distributed filters are known in the art. See, e.g., U.S. Pat. No. 6,208,299 B1 (the '299 patent). The advantage of the '299 patent is the possibility to obtain the same beamwidth for different frequency sub-bands. But the '299 patent does not allow independent beam tilt (or beam scanning) for its different sub-bands.

Antennas with distributed filters and independent (phased-array) beam tilt for each sub-band are known in the market. See, e.g., the Type No. 80010668 BSA with Adjustable Electronic Downtilt unit from Kathrein of Rosenheim, Germany.

FIG. 1 shows a simplified block diagram of a prior-art four-element antenna system 100 for supporting communications in two different sub-bands f1 and f2 with independent beam tilt. Independent beam tilt is provided by two phase shifter networks PS1, PS2, combining phase shifters and power dividers. Note that each sub-band may have different frequency ranges within the sub-band for uplink and downlink transmissions. Each antenna element 102 has its own nearby, dedicated cavity diplexer CD that combines downlink (i.e., outgoing) signals for the two different sub-bands for transmission from the corresponding antenna element 102 and separates uplink (i.e., incoming) sub-band signals received at the corresponding antenna element 102 for application to respective phase shifter networks PS1 and PS2, which provide independent beam tilt for the two sub-bands f1 and f2. The multi-cavity diplexers, connected to antenna elements 102 and phase shifter networks PS1, PS2, are used to get desirable inter-band (e.g., inter-system) isolation greater than about 30 dB between port1 and port2. Unfortunately, multi-cavity diplexers are expensive and can represent about 80% of the total antenna system cost.

Another disadvantage of prior-art antenna system 100 of FIG. 1 is that different sub-bands (having different frequencies) will have different beamwidths, because antenna beamwidth is in inverse proportion to frequency. In some cases, the beamwidths for higher-frequency wireless bands (for example, for 2.6 GHz or 3.5 GHz) become too narrow and cannot illuminate the required geographic zone. As a result, there can be a limit on the minimal-elevation beamwidth (e.g., the half-power beamwidth cannot be less than 4.5 degrees). On another hand, if the beamwidth of an antenna is too wide, then there can be too much interference with other cells. The unwanted signals reduce the signal-to-noise ratio, forcing the use of fewer efficient transmission modulations (from 64 QAM to 8 QAM or even worse QSPK) in areas where the signal-to-noise ratio is not big enough.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Figure 2:
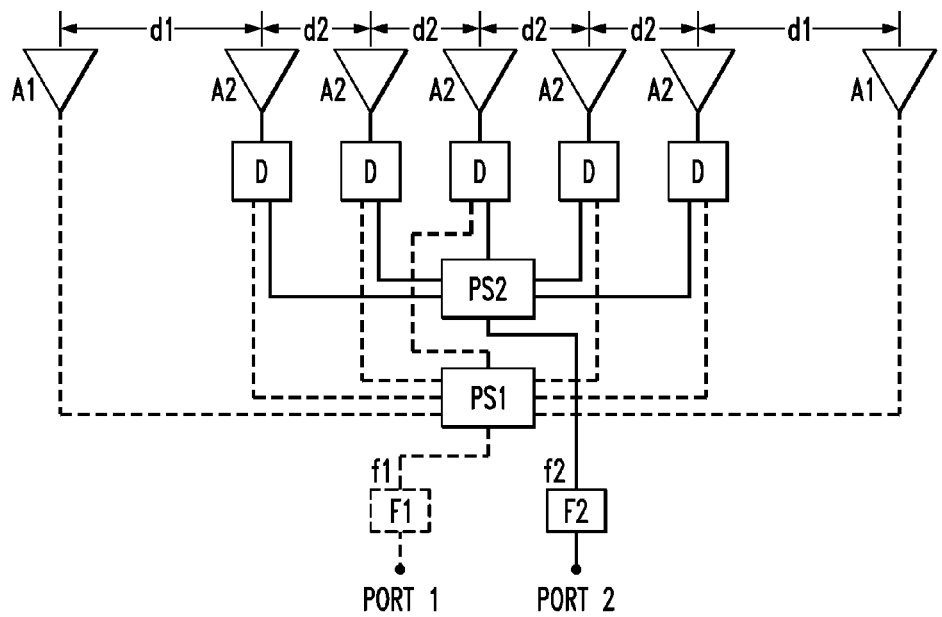
FIG. 2 shows a simplified block diagram of an exemplary seven-element antenna system of this disclosure that supports communications in two different sub-bands.

FIG. 2 shows a simplified block diagram of an exemplary seven-element antenna system 200 of this disclosure that supports communications in two different (frequency) sub-bands f1 and f2, f2>f1. According to this particular embodiment, there are two sets of antenna elements: a first set containing two relatively narrow-band elements A1 and a second set containing five relatively wide-band elements A2. Each relatively narrow-band antenna element A1 is used for only sub-band f1, while each relatively wide-band antenna element A2 is used for both sub-bands f1 and f2. Each element A1 is separated by a distance d1 from its adjacent element, while elements A2 are separated from each other by a shorter distance d2.

Figure 1:
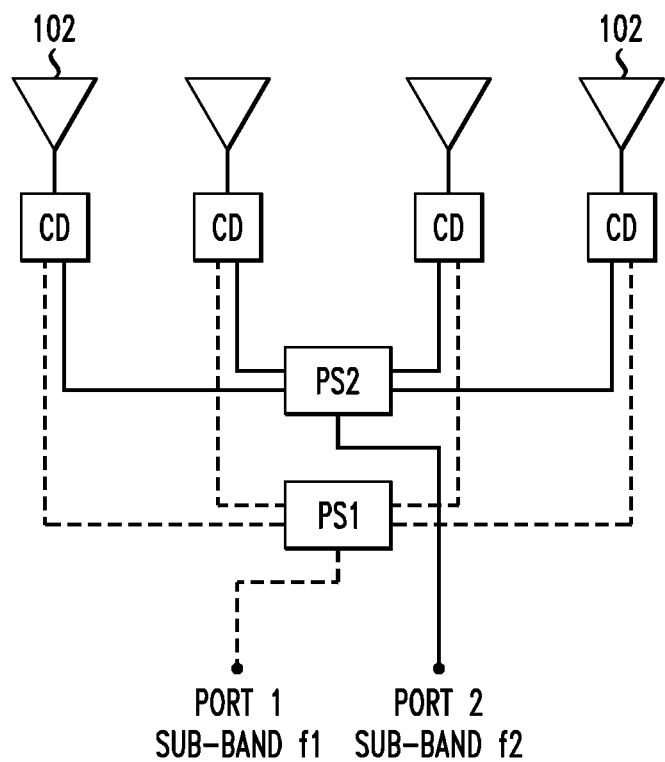
FIG. 1 shows a simplified block diagram of a prior-art four-element antenna system that supports communications in two different sub-bands.

As shown in FIG. 2, each element A2 has a nearby diplexing filter D, which can be simpler and cheaper than the cavity diplexers CD of FIG. 1. Those skilled in the art will understand that a diplexing filter (aka diplexer) separates and/or combines signals of different frequency bands, while a duplexing filter (aka duplexer) keeps transmit (e.g., downlink) signals separate from receive (e.g., uplink) signals that share the same signal path. Note that each diplexing filter D in FIG. 2 is also a duplexer, because each antenna element A2 supports simultaneous uplink and downlink communications.

In particular, each diplexing filter D in FIG. 2 combines downlink signals and separates uplink signals between the corresponding antenna element A2 and the respective phase shifter networks PS1 and PS2 with about 13-15 dB isolation between the two sub-bands. Note that, depending on the particular implementation, each phase shifter network PS1, PS2 may have a different downlink phase shifter and a different uplink phase shifter (not individually shown in FIG. 2) for each corresponding antenna element, where each phase shifter network functions as a power splitter for downlink signals and as a power combiner for uplink signals. Note that, since antenna elements A1 handle only sub-band f1 signals, there are no diplexing filters for those antenna elements. Note further that phase shifter network PS1 is connected to all of the antenna elements A1 and A2, while phase shifter network PS2 is connected to only antenna elements A2 (via their respective diplexing filters D).

Lastly, each phase shifter network PS1, PS2 is connected to a respective band-pass filter F1, F2 configured to the corresponding sub-band f1, f2. In one implementation, band-pass filter F1 passes signals in sub-band f1 and attenuates signals in sub-band f2 by about 30 dB, and analogously for band-pass filter F2 and sub-bands f2 and f1.

In antenna system 200, independent beam tilt is provided by using different phase shifter networks PS1 and PS2 for sub-bands f1 and f2. The same or similar beamwidth for both sub-bands f1, f2 is provided by using different numbers of antenna elements for the two sub-bands and different spacing (d1, d2, d1>d2) between the antenna elements. If the electrical lengths (in wavelengths) of (i) the antenna array containing elements A1 plus A2 and (ii) the array containing only elements A2 are the same, then the beamwidths for sub-bands f1 and f2 will be the same, even if the physical lengths are different.

For example, the most-desirable elevation beamwidth for DCS, IMT, and LTE2.6 bands in Europe is 6-7 degrees. This case can be realized in accordance with FIG. 2 by employing ten elements A2 with d2=105 mm and four elements A1 (two on each side of the ten elements A2) with d1=140mm. Beamwidths for this case are 6.6° for 1.71 GHz-1.88 GHz (DCS band) and 6.6° for 2.49 GHz-2.69 GHz (LTE2.6 band); i.e., the antenna beamwidth is the same for both sub-bands. If the prior-art solution of FIG. 1 is used, then the beamwidths can have a big difference: 6.6° for DCS and 3.5° for LTE2.6 (too narrow, because >4.5° is needed). Furthermore, the cost of the prior-art antenna system will be much more.

By proper selection of the number, spacing, and beamwidths of elements A1 and A2, the sub-band beamwidths can be optimized not only in the elevation plane, but also in the azimuth plane. For elements A1, highly directive radiators can be used (e.g., Yagi style radiators) to keep the number of elements A1 relatively small and also provide a relatively narrow azimuth beamwidth (e.g., close to 60-65 degrees), which usually is desired (and not achieved with relatively wideband elements A2, which usually have an azimuth beamwidth of about 70 degrees at lower frequency).

Cost reduction can be obtained by using relatively simple/low-cost diplexing filters D near elements A2 (with relatively low isolation level 13-15 dB) instead of the more-expensive cavity diplexers CD of FIG. 1 (with high isolation of about 30 dB). 13-15 dB isolation between sub-bands f1, f2 is good enough to achieve a satisfactory level of insertion loss (0.1-0.2 dB, due to coupling). The desired high level of isolation between Port 1 and Port 2 (>30-40 dB) is obtained by two high-quality band-pass filters F1, F2. So, instead of one high-cost filter per antenna element, e.g., cavity diplexing filters CD of FIG. 1, only one high-cost filter is used for each sub-band, e.g., high-quality band-pass filters F1, F2, no matter how many antenna elements there are. Also, the quantity of diplexers D is reduced, because diplexers do not need to be connected to the elements A1. As a result, the cost of antennas can be reduced by 20-60%.

Antenna parameters (such as return loss, gain, cross-polarization) for sub-band f1 also can be potentially improved, because relatively narrow-band radiating element A1 can be tuned for better performance compared to relatively wide-band radiating element A2.

In FIG. 2, the set of elements A2 is shown in the central region of the linear antenna array. This allows a symmetrical amplitude taper for the antenna for both sub-bands. In other embodiments, a group of elements A2 can be placed side-by-side with a group of elements A1, for example (without limitation), the sequence (A1, A1, A2, A2, A2, A2, A2) or (A2, A2, A2, A2, A2, A1, A1).

Thus, antenna system 200 of FIG. 2 can be implemented as a low-cost antenna with independent beam tilt for different sub-bands with the same beamwidth for each sub-band. The low cost can be achieved by using fewer and less-expensive diplexers. The same beamwidth for each sub-band can be achieved by using a different number of elements of each sub-band with different spacing. For example, independent beam tilt for DCS band (1.71-1.88 GHz) and LTE2.6 (2.49-2.69 GHz) can be achieved with the same antenna. As another example, the Digital Dividend 790-862 MHz sub-band can be provided with a different beam tilt from the GSM 880-960 MHz sub-band.

Figure 3:
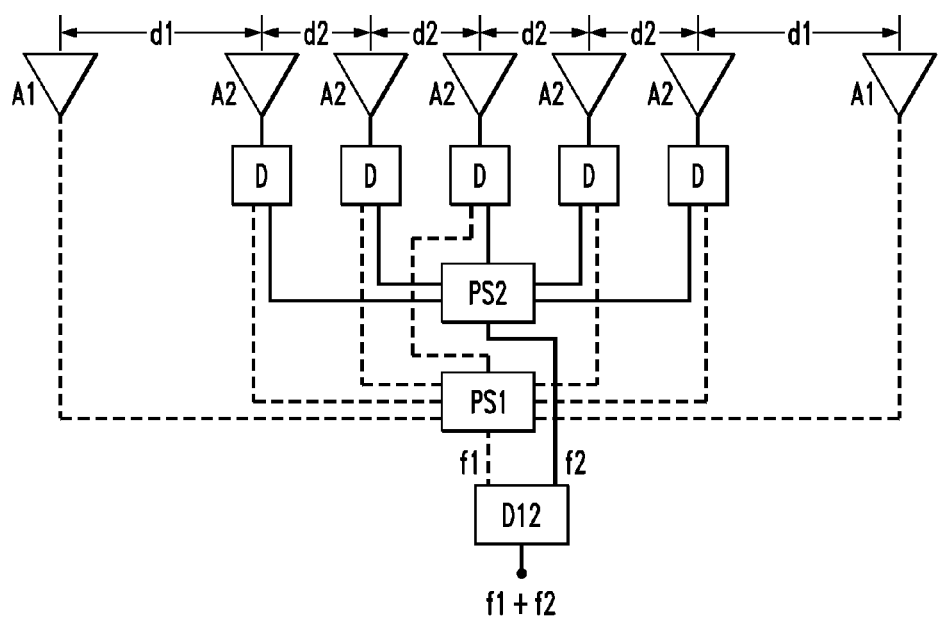
FIG. 3 shows a simplified block diagram of another exemplary seven-element antenna system of this disclosure that supports communications in two different sub-bands.

FIG. 3 shows a simplified block diagram of another exemplary seven-element antenna system 300 of this disclosure that supports communications in two different sub-bands f1 and f2. Antenna system 300 is similar to antenna system 200 of FIG. 2 except that antenna system 300 has a diplexing filter D12 instead of the two band-pass filters F1 and F2 of FIG. 2. Diplexer D12 can be the same as diplexer D or different. For example, diplexer D12 can be selected to handle high power, and D can be lower power and lower cost. Using diplexer D12 instead of two band-pass filters F1 and F2 can also save money by eliminating one cable (or waveguide) between the antenna system and the base station transceiver (not shown).

Although the disclosure has been described in the context of antenna systems supporting communications in two sub-bands, in general, antenna systems of the disclosure can be designed to support communications in two or more sub-bands.

Figure 4:
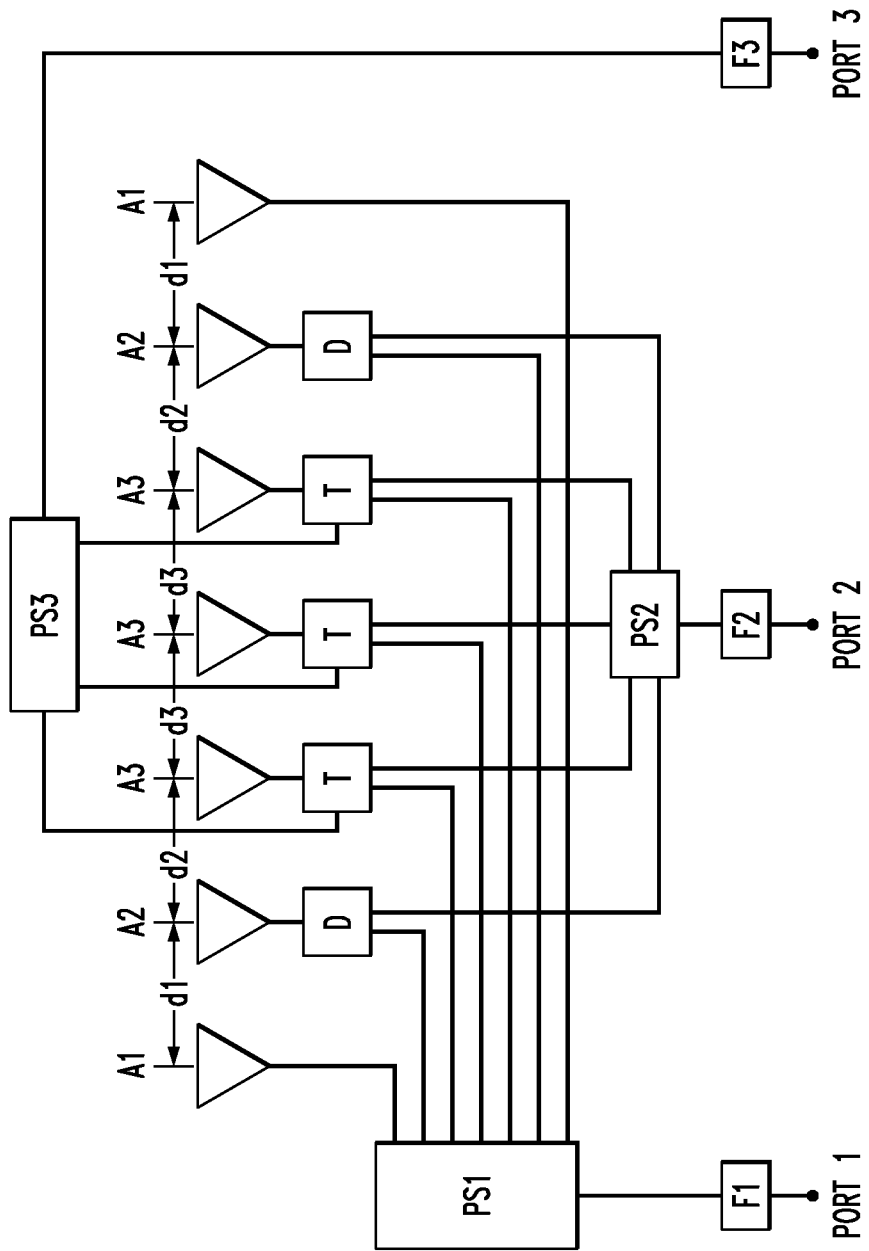
FIG. 4 shows a simplified block diagram of an exemplary seven-element antenna system of this disclosure that supports communications in three different sub-bands.

FIG. 4 shows a simplified block diagram of an exemplary seven-element antenna system 400 of this disclosure that supports communications in three different sub-bands (e.g., f1=1.7-2.17 GHz, f2=2.49-2.69 GHz, and f3=3.4-3.6 GHz). Antenna system 400 has three sets of antenna elements: a first set containing two elements A1, a second set containing two elements A2, and a third set of three elements A3. Each narrowest-band antenna element A1 is used for only sub-band f1 and covers frequencies of 1.7-2.17 GHz, each intermediate-band antenna element A2 is used for sub-bands f1 and f2 and covers frequencies of 1.7-2.69 GHz, and each widest-band antenna element A3 is used for all three sub-bands f1-f3 and covers frequencies 1.7-3.6 GHz. Each element A1 is separated by distance d1 from its adjacent element A2, each element A2 is separated by distance d2 from its adjacent element A3, and elements A3 are separated from each other by distance d3, where d1>d2>d3.

As shown in FIG. 4, each element A2 has a nearby diplexing filter D, and each element A3 has a nearby triplexing filter (aka triplexer) T. Each diplexing filter D combines outgoing signals and separates incoming signals between the corresponding antenna element A2 and the respective phase shifter networks PS1 and PS2 for sub-bands f1 and f2, while each diplexing filter T combines outgoing signals and separates incoming signals between the corresponding antenna element A3 and the respective phase shifter networks PS1, PS2, and PS3 for all three sub-bands f1-f3. Note that, since antenna elements A1 handle only sub-band f1 signals, there are no diplexing or triplexing filters for those antenna elements. Note further that phase shifter network PS1 is connected to all of the antenna elements A1, A2, and A3, while phase shifter network PS2 is connected to only antenna elements A2 (via their respective diplexing filters D) and A3 (via their respective triplexing filters T), and phase shifter network PS3 is connected to only antenna elements A3 (via their respective triplexing filters T).

Lastly, each phase shifter network PS1, PS2, PS3 is connected to a respective band-pass filter F1, F2, F3 configured to the corresponding sub-band f1, f2, f3. In one implementation, band-pass filter F1 passes signals in sub-band f1 and attenuates signals in sub-bands f2 and f3 by about 30 dB, and analogously for band-pass filters F2 and F3.

In antenna system 400, independent beam tilt is provided by using different phase shifter networks PS1, PS2, PS3 for sub-bands f1, f2, f3. The same or similar beamwidth for all three sub-bands is provided by using different numbers of antenna elements for the three sub-bands and different spacing (d1>d2>d3) between the antenna elements. If the electrical lengths (in wavelengths) of the three groups of antenna elements A1+A2+A3, A2+A3, and A3 are the same for f1, f2, and f3, then the beamwidths for the three sub-bands will be the same, even if the physical lengths are different.

Analogous to FIG. 3, the three band-pass filters F1-F3 can be replaced by a single triplexing filter (not shown) having a single feed line.

As used herein, the term "multiplexer" or "multiplexing filter" refers generally to filters, such as (without limitation) diplexing filters and triplexing filters, that combine multiple downlink signals having different frequency ranges for transmission and/or separate multiple received uplink signals having different frequency ranges. In the general case, multiplexers with up to N outputs can be used to provide independent beam tilt for each of N sub-bands with the same beamwidth, where N>1.

Although the disclosure has been described in the context of the linear or one-dimensional antenna (1-D) arrays of FIGS. 2-4, other embodiments may have two-dimensional (2-D) antenna arrays.

Figure 5:
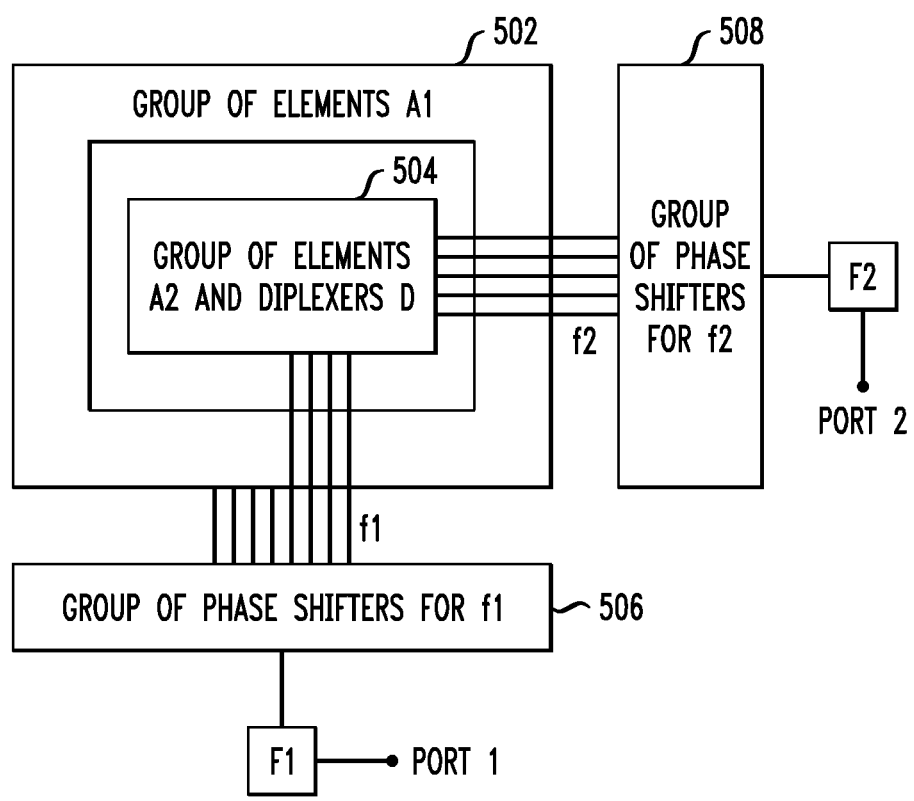
FIG. 5 shows a simplified layout block diagram of an exemplary antenna system having a two-dimensional array of antenna elements arranged into two concentric groups that supports communications in two different sub-bands.

FIG. 5 shows a simplified layout block diagram of an exemplary antenna system 500 having a two-dimensional array of antenna elements arranged into two concentric element groups: an outer 2-D sub-array 502 of relatively narrow-band elements A1 supporting band f1 and an inner 2-D sub-array 504 of relatively wide-band elements A2 supporting band f1+f2 and corresponding diplexers D. 2-D antenna system 500 is analogous to 1-D antenna system 200 of FIG. 2, with a diplexer D for each element A2, two groups 506 and 508 of phase shifters, and two band-pass filters F1 and F2 for sub-bands f1 and f2, where the phase shifters in group 506 are connected to both elements A1 (directly) and elements A2 (via their diplexers D), while the phase shifters in group 508 are connected only to elements A2 (via their diplexers D).

Two-dimensional antenna system 500 can provide 2-D beam steering in any available directions with the same beamwidth for both sub-bands independently. 2-D antenna arrays can also be implemented using a diplexing filter and a single feed line as in FIG. 3. 2-D antenna arrays can also be extended to three or more sub-bands as in FIG. 4. As with 1-D antenna systems, 2-D antenna systems can have layouts other than that shown in FIG. 5 (e.g., element groups side-by-side rather than concentric).

It should be appreciated by those of ordinary skill in the art that any block diagrams herein represent conceptual views of illustrative circuitry embodying the principles of the invention.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A system comprising:
   a plurality of first antenna elements configured to operate in a first frequency sub-band;
   a plurality of second antenna elements configured to operate in the first frequency sub-band and a second frequency sub-band, wherein the second antenna elements are arranged in a linear array, and wherein the first antenna elements are distributed on first and second ends of the linear array opposite from each other;
   a plurality of multiplexing filters, each connected between a respective one of the plurality of second antenna elements and a first phase shifter network, wherein the first phase shifter network is connected to each first antenna element and to each multiplexing filter;
   a second phase shifter network connected to each multiplexing filter and isolated from the first antenna elements; and
   one or more frequency filters connected to the first and second phase shifter networks.

2. The system of claim 1, wherein beam tilt for the first frequency sub-band is independent of beam tilt for the second frequency sub-band.

3. The system of claim 1, wherein a first azimuth beamwidth for the first frequency sub-band is substantially equal to a second azimuth beamwidth for the second frequency sub-band.

4. The system of claim 1, wherein each first antenna element has a bandwidth different from a bandwidth of each second antenna element.

5. The system of claim 1, wherein:
   each first antenna element is separated from an adjacent antenna element by a first distance; and
   each second antenna element is separated from an adjacent antenna element by a second distance different from the first distance.

6. The system of claim 1, wherein the first phase shifter network is connected directly to each first antenna element without any intervening multiplexing filter.

7. The system of claim 1, wherein each multiplexing filter is a diplexing filter.

8. The system of claim 1, further comprising:
   a plurality of third antenna elements configured to communicate simultaneously via the first frequency sub-band, the second frequency sub-band, and a third frequency sub-band;
   a second plurality of multiplexing filters respectively connected to each third antenna element; and
   a third phase shifter network connected to each multiplexing filter in the second plurality of multiplexing filters and isolated from each first antenna element and from each second antenna element, wherein:
   the first phase shifter network is connected to each third antenna element;
   the second phase shifter network is connected to each third antenna element; and
   the one or more frequency filters are further connected to the third phase shifter network.

9. The system of claim 8, wherein:
   each multiplexing filter in the plurality of multiplexing filters comprises a diplexing filter; and
   each multiplexing filter in the second plurality of multiplexing filters comprises a triplexing filter.

10. The system of claim 1, wherein the one or more frequency filters comprise:
    a first bandpass filter connected to the first phase shifter network; and
    a second bandpass filter connected to the second phase shifter network.

11. The system of claim 1, wherein the one or more frequency filters comprise a single multiplexing filter connected to both the first phase shifter network and the second phase shifter network.

12. A system comprising:
    a linear array of antenna elements comprising a first plurality of antenna elements and a second plurality of antenna elements, wherein the first plurality of antenna elements are configured to support communications via a first frequency sub-band, and wherein the second plurality of antenna elements are configured to support communications via the first frequency sub-band and a second frequency sub-band;
    a first phase shifter network coupled to each and every antenna element of the system configured to support communications via the first frequency sub-band;
    a second phase shifter network coupled to only the second plurality of antenna elements and isolated from the first plurality of antenna elements; and
    a plurality of multiplexers respectively coupled to each antenna element of the second plurality of antenna elements, the first phase shifter network, and the second phase shifter network,
    wherein the first phase shifter network adjusts a beam tilt for the first frequency sub-band, and is independent from the second phase shifter network, which adjusts a beam tilt for the second frequency sub-band.

13. The system of claim 12, wherein the second phase shifter network is connected to each multiplexer of the plurality of multiplexers and is isolated from the second plurality of antenna elements.

14. An apparatus comprising:
    a first plurality of antenna elements, wherein each antenna element of the first plurality of antenna elements supports a first bandwidth that includes a first frequency sub-band;
    a second plurality of antenna elements, wherein each antenna element of the second plurality of antenna elements supports a second bandwidth greater than the first bandwidth and that includes the first frequency sub-band and a second frequency sub-band that does not overlap the first frequency sub-band;
    a first phase shifter network;
    a second phase shifter network; and
    a plurality of multiplexers, wherein each multiplexer of the plurality of multiplexers is connected between a respective antenna element of the second plurality of antenna elements the first phase shifter network, and the second phase shifter network,
    wherein the first phase shifter network is connected to the multiplexers and to each antenna element of the first plurality of antenna elements,
    wherein the second phase shifter network is connected to the multiplexers and isolated from the first plurality of antenna elements.

15. The apparatus of claim 14, further comprising:
    one or more frequency filters connected to the first and second phase shifter networks.

16. The apparatus of claim 14, wherein each multiplexer comprises a non-cavity diplexing filter.

17. The apparatus of claim 14, wherein each antenna element of the first plurality of antenna elements is more directive than each antenna element of the second plurality of antenna elements.

18. The apparatus of claim 14, wherein the first plurality of antenna elements and the second plurality of antenna elements are configured to form a first beam having a first frequency in the first frequency sub-band and having a first azimuth beamwidth, and wherein the second plurality of antenna elements are configured to form a second beam having a second frequency in the second frequency sub-band and having a second azimuth beamwidth that is greater than the first azimuth beamwidth.

* * * * *